(12) United States Patent
Jobard et al.

(10) Patent No.: US 8,148,925 B2
(45) Date of Patent: Apr. 3, 2012

(54) ELECTRIC SAFETY BRAKING DEVICE WITH PERMANENT MAGNET MOTOR AND BREAKING TORQUE CONTROL

(75) Inventors: Thierry Jobard, Lyons (FR); Eric Bonin, Jardin (FR)

(73) Assignee: Alstom Transport SA, Levallois-Perret (FR)

( * ) Notice: Subject to any disclaimer, the term of this patent is extended or adjusted under 35 U.S.C. 154(b) by 714 days.

(21) Appl. No.: 12/231,568

(22) Filed: Sep. 4, 2008

(65) Prior Publication Data

US 2009/0066272 A1 Mar. 12, 2009

(30) Foreign Application Priority Data

Sep. 4, 2007 (FR) ..................................... 07 57339

(51) Int. Cl.
*H02P 3/14* (2006.01)
(52) U.S. Cl. ......................... 318/376; 318/362; 318/375
(58) Field of Classification Search .................. 318/87, 318/362, 375, 376, 727, 759, 783, 432, 434
See application file for complete search history.

(56) References Cited

U.S. PATENT DOCUMENTS

| | | | | |
|---|---|---|---|---|
| 3,991,352 A | * | 11/1976 | Fry et al. ....................... | 318/759 |
| 4,039,914 A | * | 8/1977 | Steigerwald et al. ......... | 318/375 |
| 4,096,423 A | * | 6/1978 | Bailey et al. .................. | 318/370 |
| 4,426,606 A | * | 1/1984 | Suita et al. .................... | 318/375 |
| 5,323,095 A | * | 6/1994 | Kumar .......................... | 318/376 |
| 5,808,392 A | * | 9/1998 | Sakai et al. ................... | 310/214 |
| 6,938,555 B2 | * | 9/2005 | Jockel .......................... | 105/34.1 |

FOREIGN PATENT DOCUMENTS

| | | |
|---|---|---|
| DE | 101 60 612 A1 | 6/2003 |
| DE | 10 2004 032 680 A1 | 2/2006 |
| EP | 1 520 829 A1 | 4/2005 |
| GB | 1008700 | 11/1965 |
| JP | 01 133583 | 5/1989 |
| WO | WO 03/049256 A2 | 6/2003 |

* cited by examiner

*Primary Examiner* — Walter Benson
*Assistant Examiner* — Anthony M Paul
(74) *Attorney, Agent, or Firm* — Davidson, Davidson & Kappel, LLC

(57) ABSTRACT

This electric safety braking device for an electric traction vehicle may allow the force/speed characteristic of the vehicle to be improved and includes a rotating electromechanical machine with permanent magnets which has at least one coil with electric terminals, a rheostatic electric braking torque production device, and a commutation device which are capable of connecting the electric terminals of the electromechanical machine to the braking torque production device. The electric safety braking device includes at least one inductor is connected in series between the braking torque production device and the electromechanical machine.

11 Claims, 4 Drawing Sheets

ELECTRIC SAFETY BRAKING DEVICE WITH PERMANENT MAGNET MOTOR AND BREAKING TORQUE CONTROL

This claims the benefit of FR 07 57339 filed on Sep. 4, 2007 and hereby incorporated by reference herein.

The invention relates to an electric safety braking device which has braking torque control and which is intended for a vehicle which is electrically driven, for example, a rail vehicle.

BACKGROUND OF THE INVENTION

A safety braking system ensures the desired braking force is produced in an extremely reliable manner.

In the field of rail transport, there are principally two types of braking operation: service braking and emergency braking.

The service braking operation is the one which is most commonly used during operation. It can be adjusted between a minimum force value close to 0 and a maximum force value. It can be broken down itself into a plurality of modes, depending on the trains: purely electric brake, purely mechanical brake or combined electric and mechanical brake. It carries out all the "normal" stopping and deceleration operations of the train, and the braking operations for holding on declines. However, it is not secure in the sense that it involves a large number of electric, electronic, mechanical, pneumatic or hydraulic components which may malfunction and therefore bring about a different braking force from that desired, or even, with the new traction chains having traction/static braking commutation, a traction force.

The emergency braking operation is used, as its name suggests, only in the event of an emergency. This emergency condition may be brought about either by an external emergency situation or by a malfunction of the service brake. The object of this brake is to stop the train as quickly and safely as possible. This brake cannot be adjusted but is reliable, that is to say, its probability of failure must be extremely low. This brake must therefore use the fewest possible number of components. Generally, it is purely mechanical, but this requires the mechanical brake to be sized accordingly which may be found to be prohibitive in terms of cost or mass, in particular in a high-speed train where the levels of braking energy to be dissipated are significant. For this reason, it may be very advantageous to produce an electric safety brake.

An electric safety braking device is described in patent DE 101 60 612 A1. The disadvantage of this device is that the force/speed characteristic of the electric safety braking obtained is dependent only on the characteristics of the motor and the brake resistance value selected; it cannot therefore be adjusted, that is to say, it does not allow the desired force/speed curve to be approached. For example, it may lead to excessive levels of force at high speed which would bring about an excessive level of adhesion or, on the contrary, levels of force which are too low at low speed.

German patent application published as DE 10 2004 032 680 A1 relates to a braking system comprising a network of brake resistors which is connected in the form of a star or a triangle and which is capable of being coupled to a permanent magnet motor using an electromechanical type commutator comprising a set of relays. It involves adding a capacitive network which comprises three capacitors which are mounted in parallel on the brake resistor network. In the absence of control by an active regulation system, this capacitive network allows the braking force produced by the electric safety brake at high speed to be increased by compensating for the reactive energy produced by the internal coils of the stator of the motor.

SUMMARY OF THE INVENTION

An object of the device proposed by this invention is to allow the force/speed characteristic of this electric safety brake to be adjusted in order to make it more coherent with respect to the level of adhesion available in accordance with the speed and therefore a more efficient electric safety brake may be obtained.

The invention proposed in this instance provides another device which in contrast allows the braking force to be limited at high speeds where the adhesion is relatively low, while allowing a significant level of electric braking force to be provided at low speeds. It involves adding a network of three-phase inductors between the resistor device for producing a braking torque and the permanent magnet motor.

The invention provides an electric braking device which has braking torque control and which is intended for an electric traction vehicle, in particular a rail vehicle, comprising a rotating electromechanical machine which has at least one coil with electric terminals, a rheostatic electric braking torque production device which has no active power switches, commutation means which are capable of selectively connecting the electric terminals of the electromechanical mechanism to the braking torque production device, characterised in that at least one inductor for controlling braking torque is connected in series between the commutation means and the braking torque production device.

According to specific embodiments, the braking device may include one or more of the following features:

the electromechanical machine has permanent magnets,
a current switch for assisting the commutation of the commutation means is connected to the terminals of each inductor,
the commutation means are of the electromechanical type,
the braking torque production device comprises at least one brake resistor which is connected to the commutation means via at least one inductor for controlling braking torque,
the braking torque production device comprises at least three brake resistors which are electrically mounted in the form of a star,
the braking torque production device comprises three brake resistors which are electrically mounted in the form of a triangle,
the braking torque production device comprises a diode bridge rectifier and a resistor which is connected to the output terminals of the diode bridge rectifier,
the inductors for controlling braking torque are connected between the commutation means and the diode bridge rectifier,
the braking torque production device includes the bridge rectifier which is formed by the free wheel diodes of a traction inverter which is connected to the commutation means, a brake resistor which is connected to the terminals of the traction inverter, a contactor which is connected in series to the brake resistor and a blocking circuit which allows the electronic power switches of the traction inverter to be safely inhibited, and
the braking torque control inductors are connected between the commutation means and the traction inverter.

BRIEF DESCRIPTION OF THE DRAWINGS

The invention will be better understood from a reading of the following description of an embodiment, given purely by way of example and with reference to the drawings, in which.

DETAILED DESCRIPTION OF A PREFERRED EMBODIMENT

Figure 1:
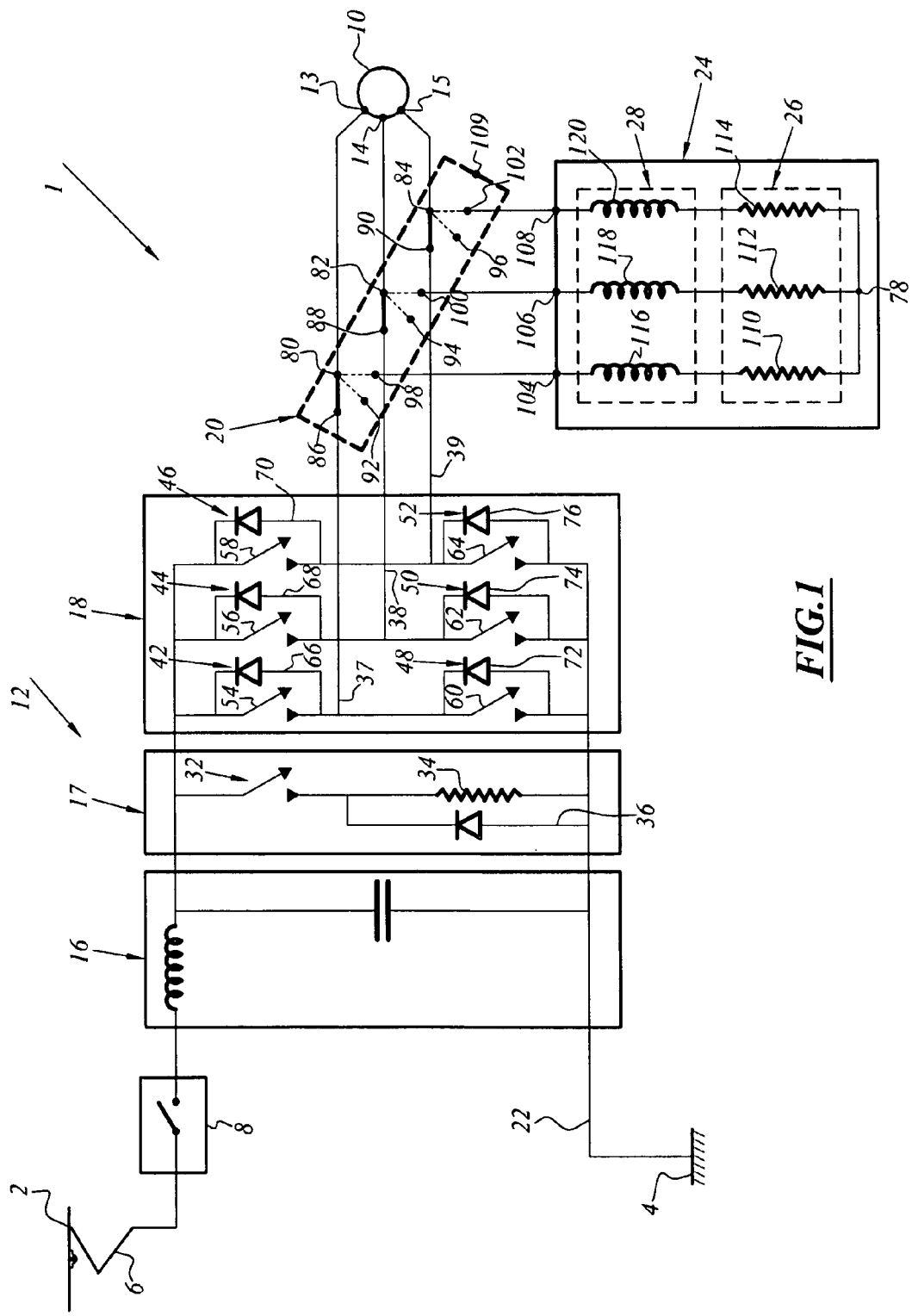
FIG. 1 is an electric circuit diagram of a first embodiment of an electric safety brake which is integrated in a traction chain.

FIG. 1 illustrates an electric safety motor brake integrated in an electric traction chain 1 of a rail vehicle.

The electric traction chain 1 is supplied with electrical power by means of a catenary line (or a third rail) 2 which is under high voltage and which is referenced by a ground 4 which is connected to the earth.

The electric traction chain 1 comprises, in sequence, a pantograph (or skate) 6 for capturing electrical energy from the catenary line 2 followed by a line circuit-breaker 8 which acts as a main switch/contactor between the traction chain 1 and the catenary line 2.

The traction chain 1 also comprises a rotating electromechanical machine 10 which is in a state of permanent excitement and which is capable of being supplied with electrical power via an electronic power converter 12.

The rotating electromechanical machine 10 in this instance comprises a stator which has coils having a three-phase power supply and which is provided with electric input terminals 13, 14, 15 for each phase and a rotor whose excitation is provided by a permanent magnet.

In electric traction mode, the electromechanical machine 10 operates as a motor while, in electric braking mode, it operates as a voltage generator.

The electronic power converter 12 comprises, in sequence from the circuit-breaker 8 to the motor 10, a line filter 16 which has a conventional LC structure with a series inductor and a capacitor which is mounted in parallel, a conventional rheostatic braking chopper 17 and an inverter 18, in this instance having a three-phase alternating output which is capable of supplying the rotating mechanism 10 with electrical power via an electromechanical connection commutator 20.

All of the elements of the traction chain are connected to the common ground 4 via an earth return line 22.

The electric traction chain 1, in addition to being capable of operating as a traction chain, is also capable of operating as a first, non-safety electric brake, referred to as the service brake.

The first electric brake referred to as a service brake comprises the components of the traction chain 1, that is to say, the generator 10, the inverter 18 which is configured as a rectifier, the rheostatic braking chopper 17, the line filter 16 and the electromechanical commutator 20.

A second electric brake, referred to as a safety brake, in addition to the electromechanical machine 10, comprises the electromechanical connection commutator 20 and a controlled braking torque production assembly 24 which comprises a braking torque production device 26 in the form of a resistive network of dissipative load resistors and a passive braking torque control device 28 in the form of a network of inductors which is capable of adjusting the electric safety braking torque to the maximum power of the electromechanical machine and the wheel/rail adhesion which is a priori available in accordance with the speed.

The rheostatic braking chopper 17 comprises an electronic power switch 32, which is of the IGBT type (Insulated Gate Bipolar Transistor) and which is, for example, connected in series to a rheostatic brake resistor 34 to which a free wheel diode is connected in parallel.

The inverter 18 comprises three alternating three-phase output lines 37, 38, 39 which are each capable of being connected to an electric stator phase input terminal 13, 14, 15, respectively, of the motor 10 via a connection which is produced using the electromechanical commutator 20.

The inverter 18 is composed of a conventional structure having 6 electronic power switches 42, 44, 46, 48, 50, 52 which are connected in three phases connected between the output of the input filter 16 and the return line 22.

Each electronic power switch 42, 44, 46, 48, 50, 52 comprises a power transistor 54, 56, 58, 60, 62, 64 which is, for example, of the IGBT type and which can be controlled in a conductive state/non-conductive state for a power current, each power transistor being associated with a free wheel diode 66, 68, 70, 72, 74 and 76 which is mounted in an anti-parallel manner thereon.

In this instance, in FIG. 1, the arrow of each power transistor represents the flow direction of the current when this transistor is conductive.

Each power switch 42, 44, 46 is associated with a power switch 48, 50, 52, respectively, the output of one of the first switches being connected to the input of one of the second switches and forming an output of the inverter, each output being connected to an output line 37, 38, 39 of the inverter, respectively.

The control circuits of the electronic power switches are not illustrated in FIG. 1 and are assumed to be capable of providing the electromechanical machine 10 in motor mode with a synchronous traction function.

The electromechanical commutator 20 comprises an assembly of three input pins 80, 82, 84 which are connected to the three input terminals 13, 14, 15 of the motor 10, respectively.

The electromechanical commutator 20 also comprises a first group of output pins 86, 88, 90 which are connected to the output lines 37, 38, 39 of the inverter 18, respectively.

The electromechanical commutator 20 also comprises a second group of output pins 92, 94, 96 which are electrically isolated and which are capable of being connected to the input pins 80, 82, 84, respectively, in order to isolate the motor 10 from the inverter 18.

The electromechanical commutator 20 also comprises a third group of output pins 98, 100, 102 which are connected to the braking torque production device 24 at inputs 104, 106, 108, respectively.

The electromechanical commutator 20 comprises a control input 109 which is capable of receiving a commutation command which allows selective commutation of all of the electrical connections produced by mechanical contact elements, from input pins 80, 82 and 84 to output pins between the first group of output pins, the second group of output pins and the third group of output pins. Since the electromechanical commutator 20 includes a limited number of passive elements, it may be safe and reliable.

The controlled braking torque production assembly 24 comprises input terminals 104, 106, 108 which are connected to the output pins 98, 100, 102 of the third group of the electromechanical commutator 20, respectively.

In this instance, the resistive network 26 which forms the braking torque production device is an assembly of three resistors 110, 112, 114 which are connected in a star-like manner to a common node 78. Each resistor 100, 112, 114 of the network is connected to an inductor 116, 118, 120, respectively, of the inductive network 28 which forms the passive control device which is itself connected to the associated input terminal 104, 106, 108 of the third group of output pins of the electromechanical commutator 20.

During operation in traction mode the electromechanical mechanism 10 operates as a motor and the electromechanical commutator 20 is configured in such a manner that the output pins 86, 88, 90 of the first group are connected to the input pins 80, 82, 84. In this manner, the inverter 18 supplies the motor 10 with a sinusoidal current wave which is adapted in a synchronised manner to the speed of the motor.

During a service braking operation, the electromechanical commutator 20 remains in the same state as during the traction operation.

The inverter 18 is configured to operate in rectifier mode and the chopper 17 limits the braking power that is conveyed in the line 6 to the maximum power which it is able to receive, any surplus of braking power being dissipated in the resistor 34.

During an electric safety braking operation, the electromechanical commutator 20 is switched successively to the second group 92, 94, 96, then the third group of output pins 98, 100, 102 in order to isolate the motor 10 from the power converter 12, then to connect each terminal 13, 14, 15 of the rotating machine 10 which acts as a generator to the braking torque production device 24 via the respective inputs 104, 106 and 108.

The generator 10 transfers a current via each electric terminal 13, 14, 15 in the resistive load network 26 formed by the three resistors 110, 112 and 114.

The mechanical energy of the vehicle is therefore converted into electrical energy in the generator 10, then into heat by means of the Joule effect in the resistive network 26, which brakes the vehicle.

If the inductive network 28 is not present, while the electromotive force of the rotating machine 10 is proportional to the rotation speed thereof, the levels of inductance specific to the stator bring about a loss of voltage which is also proportional to the speed, which has the effect of slightly reducing the braking torque provided in accordance with the speed.

However, this is not sufficient at high speeds owing to the levels of inductance specific to the stator having a value which is too low.

The addition of an inductor 116, 118, 120 in series with each stator phase inductor which is accessible from 13, 14, 15 allows the voltage drop to be increased in proportion with the rotation speed of the rotor of the electromechanical mechanism 10 and thus allows the braking torque produced to be adjusted within a range of values which are compatible with the maximum power of the motor, thus preventing the wheels from becoming locked while bringing about the maximum level of adhesion.

The addition of inductors as described above therefore allows the braking torque production device 26 to be selected with low ohm values for the resistors 110, 112, 114 in order to obtain a level of torque at low speeds which is still high while reducing the excessively high level of torque which would have been obtained at high speeds and which could have caused the maximum electrical power of the motor to be exceeded, with the risk of excessive levels of sliding of the wheels.

In contrast to the device described in the patent application DE 10 2004 032 680 A1 which, for a given resistor value 110, 112, 114, allows the braking force to be increased at high speed, with the drop of inductive voltage in the coils of the stator of the motor being compensated for, the device described in this instance in FIG. 1 instead allows this force to be limited at high speed in accordance with the power of the motor and the adhesion which is a priori available at high speeds. The device described in this instance therefore allows resistors with low ohm values to be selected in order to obtain significant braking force at low speed without the risk of having excessive levels of braking force at high speeds.

Figure 2:
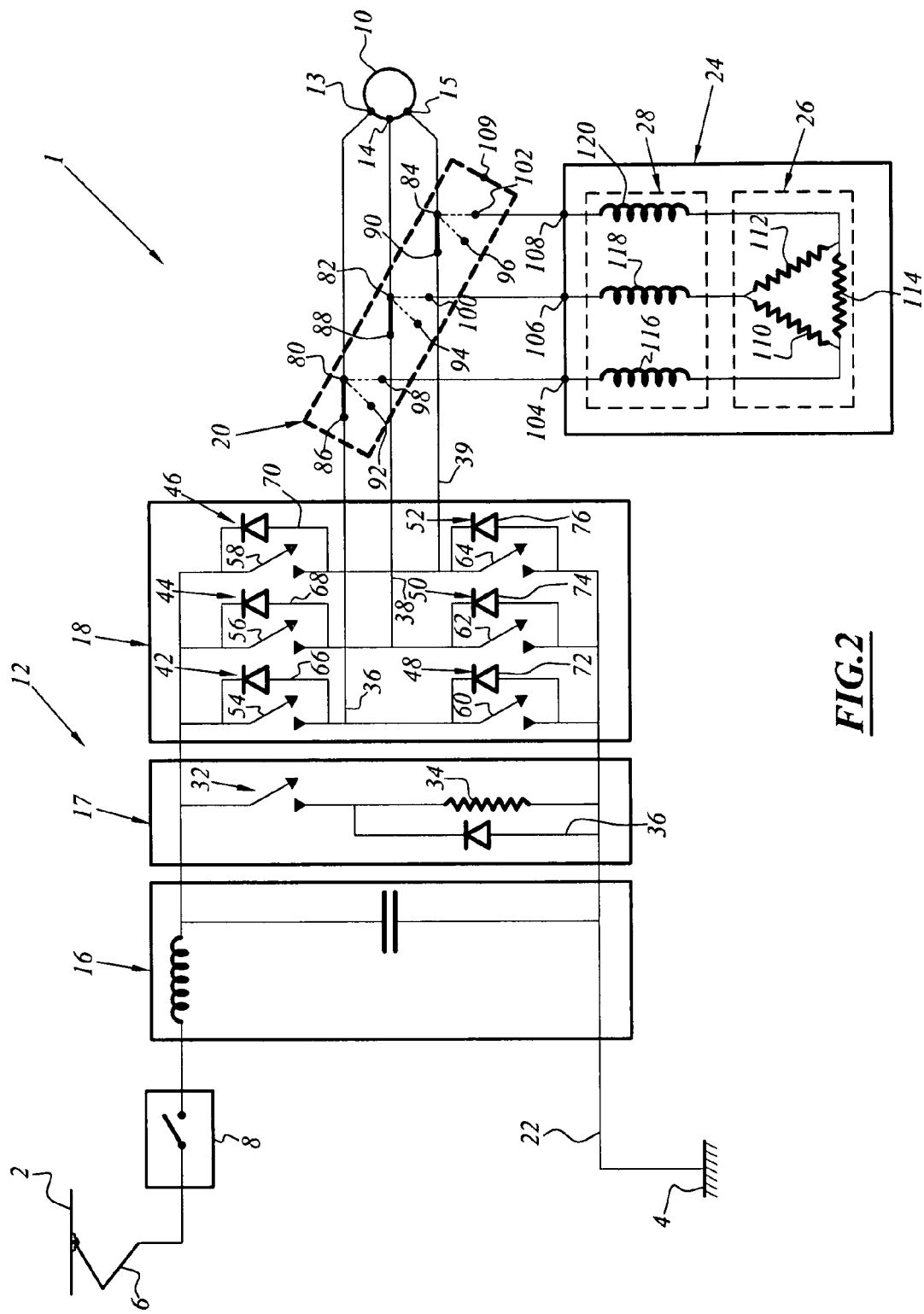
FIG. 2 is an electric circuit diagram of a variant of the embodiment of the safety motor brake of FIG. 1 in which the braking torque production device is a network of resistors which are mounted in the form of a triangle.

FIG. 2 illustrates a variant of the electric safety brake of FIG. 1 in which the resistors 104, 106, 108 of the resistive network 26 are mounted in the form of a triangle instead of being mounted in the form of a star, as in FIG. 1.

For FIG. 2, the operation of the electric safety brake is similar to that of FIG. 1, the resistive load 26 which is mounted in the form of a triangle being similar to a resistive load which is mounted in the form of a star.

An advantage of an arrangement in the form of a triangle is that it allows two thirds of the braking power to be retained in the event of a simple breakdown instead of only half with resistors which are mounted in the form of a star.

Figure 3:
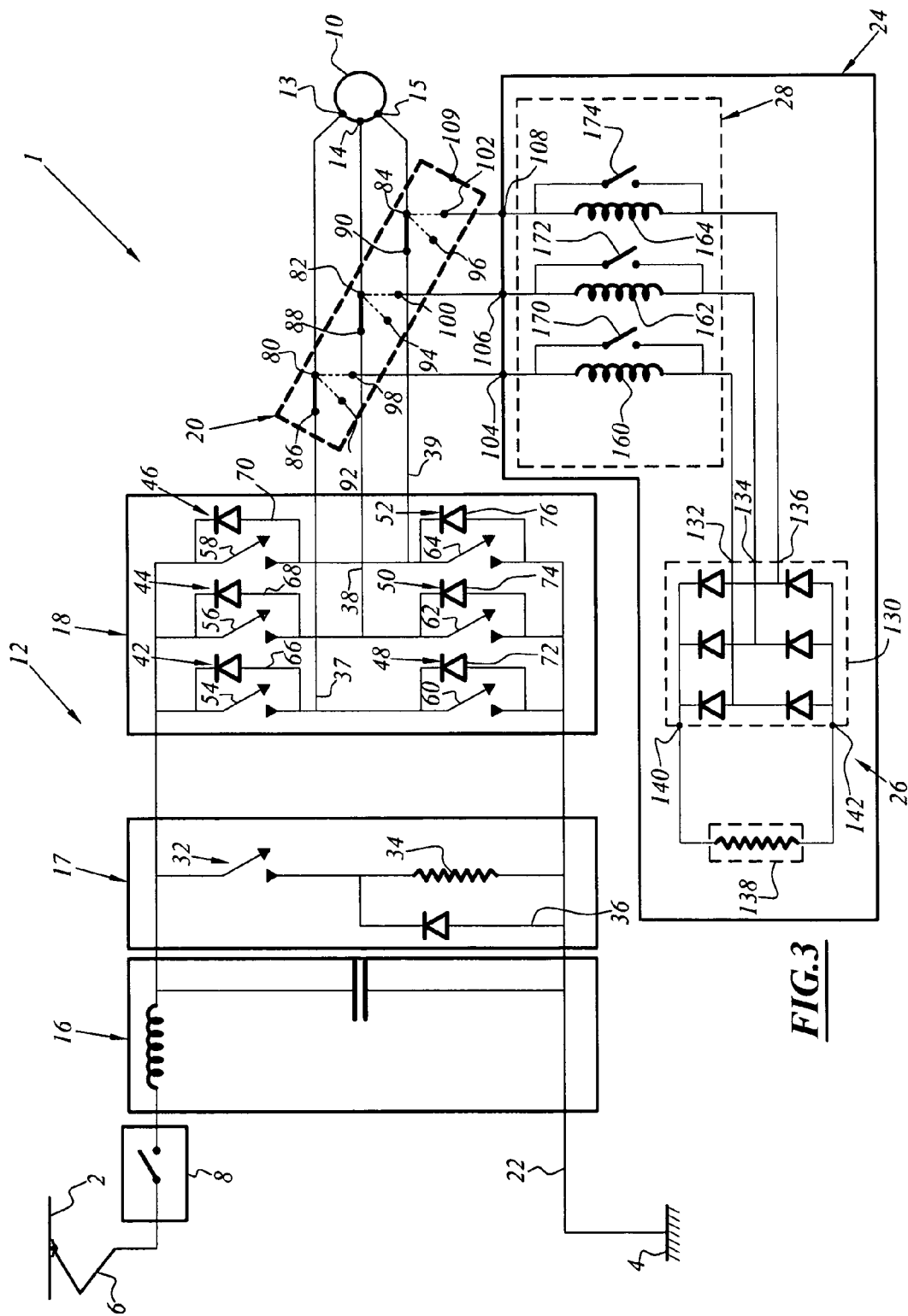
FIG. 3 is an electric circuit diagram of a variant of the embodiments described in FIGS. 1 and 2 of the safety motor brake in which the braking torque production device comprises only one resistor.

FIG. 3 is a variant of the electric safety brake in which the braking torque production device 26 comprises only one resistor with a diode bridge rectifier being added.

The braking torque production device 26 is formed by a conventional diode bridge 130 which is configured passively as a bridge rectifier, with three inputs 132, 134 and 136 which are capable of receiving an electrical power supply, in this instance a three-phase electrical power supply.

The braking torque production device 26 is also formed by a single terminal bipolar load resistor 138 which is connected between two outputs 140 and 142 of the diode bridge 130. The diode bridge 130 is composed in this instance of six diodes.

The passive control device 28 comprises an assembly of three inductors 160, 162, 164, each of which is connected in series between the input 132, 134, 136 of the diode bridge 130, and the output pin of the third output group 98, 100, 102 of the electromechanical commutator 20, respectively.

A contactor 170, 172, 174 is connected to each inductor 160, 162, 164, respectively, and allows the emergency braking operation to be stopped at any time without creating prohibitive levels of excess voltage by simultaneously closing the contactors 174, 176, 178 and opening the contactors of the electromechanical commutator 20 immediately afterwards.

During operation, in the event of a safety braking operation, the contactors 170, 172, 174 are in the open state.

The generator 10 transfers a current for each electric terminal 13, 14, 15 in the braking torque production device 26 at the inputs 132, 134, 136 via the passive control device 28.

After rectifying the alternating output currents of the generator 10, the diode bridge rectifier 130 provides a continuous supply of electrical energy for the single resistor 138 which dissipates the electrical energy in the form of heat via the Joule effect.

The operation of the control implemented by the inductors 160, 162, 164 is similar to that described in FIGS. 1 and 2.

If it is desirable to stop the safety braking operation at high speed, it must be possible to switch the commutator 20 into a position which allows the generator 10 to be disconnected from the passive control device 28.

In this instance, the current which is stored by the inductors 160, 162, 164 could produce unacceptable levels of excess voltage during the electromechanical switching of the commutator 20.

In order to facilitate the commutation of the commutator 20, prior to the disconnection of the inductors 160, 162, 164 from the output pins 98, 100, 102 of the commutator, the contactors 170, 172, 174 are closed in a controlled manner.

In this manner, the inductors 160, 162, 164 are short-circuited and the current stored inside each inductor is able to flow freely.

Then, the commutator 20 disconnects the input pins 104, 106 and 108 from the inductors 160, 162, 164.

When the commutation of 20 has been carried out, after a predetermined length of time, the contactors 170, 172, 174 are opened in a controlled manner.

In this manner, a traction or service braking operation may be initiated and implemented in a similar manner to that described in FIGS. 1 and 2.

Figure 4:
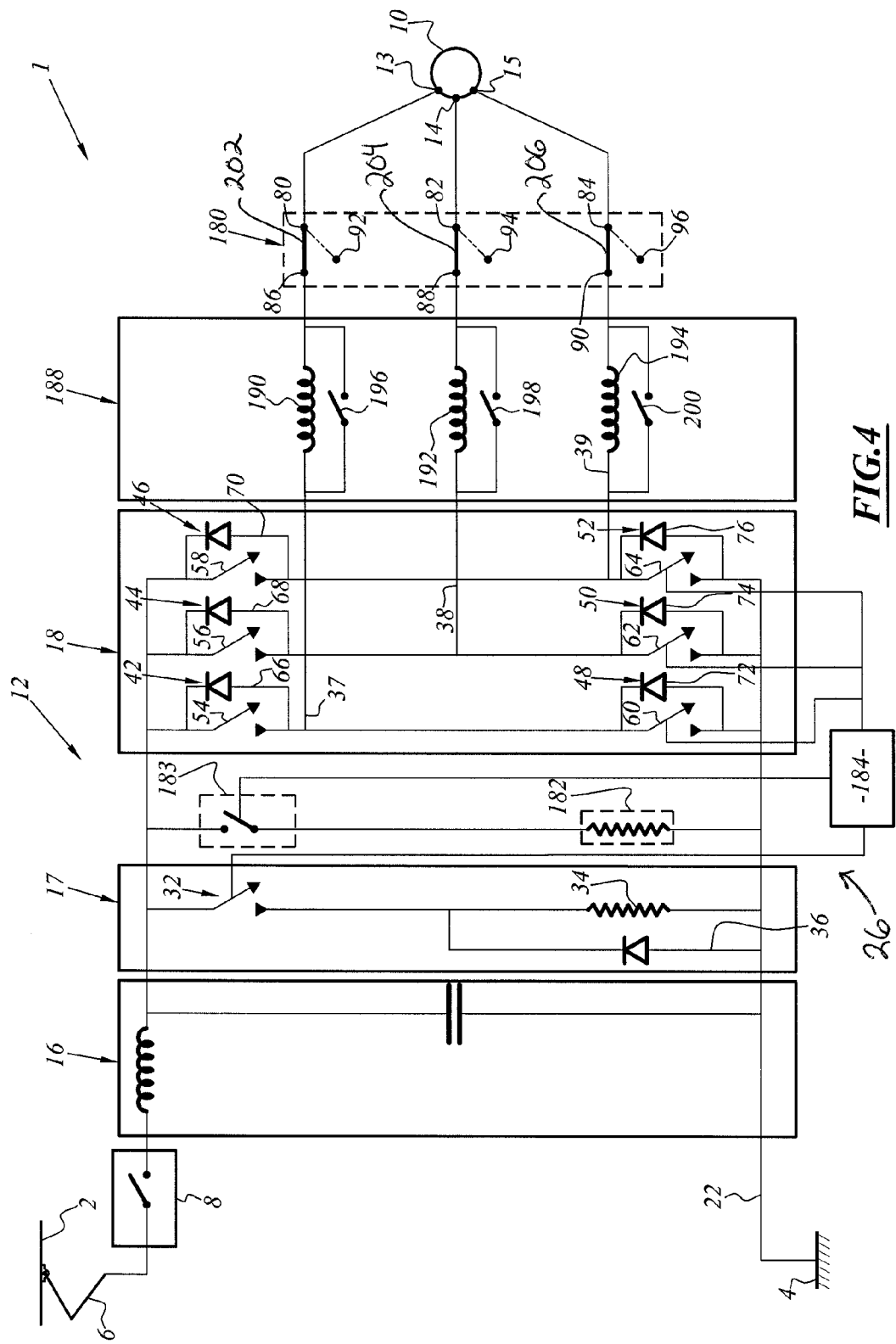
FIG. 4 is an electric circuit diagram of a production variant of the safety motor brake having a higher level of integration in the traction chain than that of FIGS. 1 to 3.

FIG. 4 is a schematic view of a variant of an electric safety brake of the embodiments described in FIGS. 1, 2 and 3, having a higher level of integration with the electric traction chain.

The electric traction chain 1 is similar to that described in FIG. 3 and differs from it in that:
the electromechanical commutator 20, having three groups of output pins, is replaced by an electromechanical commutator 180 which comprises only the first group 86, 88, 90 and second group 92, 94, 96 of output pins;
the braking torque production device 26 includes in this instance:
the free wheel diode bridge 66, 68, 70, 72, 74, 76 of the inverter 18,
a load resistor 182 which is connected in series to an electromechanical contactor 183, the assembly being connected to the terminals of the chopper 17 and the inverter 18,
blocking circuits 184 which allow the power switches 54, 56, 58, 60, 62, 64 of the inverter 18 and 32 of the chopper 17 to be safely blocked, and the contactor 183 to be closed.

The electromechanical commutator 180 serves to disconnect the motor 10 from the inverter 18, in the event of a short-circuit thereof. This commutator is conventionally used in this type of traction chain and is not modified by the invention.

The operation in traction mode and in service braking mode is identical to that described for FIGS. 1, 2 and 3.

During an electric safety braking operation the electromechanical commutator 180 remains in the state in which the electromechanical mechanism 10 is connected to the inverter 18.

The blocking circuits 184 open the six power transistors 54, 56, 58, 60, 62, 64 of the inverter 18 and the power transistor 32 in a controlled manner.

In parallel, the circuits 184 close the auxiliary electromechanical relay 183 in a controlled manner.

In this manner, the power inverter 18 acts as a simple bridge rectifier which includes the diodes 66, 68, 70, 72 74, 76. The blocking circuits 184 prevent the inverter 18 from acting as an inverter in a secure manner.

In this manner, the free wheel diode bridge 66, 68, 70, 72, 74, 76 acts as the bridge rectifier 130 of FIG. 3; it provides the energy of the generator 10 in the load resistor 182 which is connected to the bridge.

A passive control device 188 comprises an assembly of inductors, in this instance there are three, 190, 192 and 194, each of which is connected at one side and the other to an output 37, 38, 39 of the inverter 18 and an output pin 86, 88, 90 of the first group of output pins of the commutator 180.

In parallel, a contactor 196, 198, 200 is connected to each inductor 190, 192, 194 and allows the emergency braking operation to be stopped at any time without creating prohibitive levels of excess voltage. To this end, the contactors 196, 198, 200 are simultaneously closed and the contactors 202, 204, 206 of the electromechanical commutator 180 are opened immediately afterwards.

The device 180 for improving the force/speed characteristic of the electric safety brake operates in the same manner as the device 28 of FIG. 3.

An advantage afforded by the control device may be that the braking torque is adapted in accordance with the speed in order to take into account the adhesion of the wheels to the rails. This advantage may be appreciable at high speed, taking into account that, in the absence of a control device, the risk of locking during braking at high speed is high.

An advantage afforded by the device described in FIG. 4 may be the high level of integration thereof in the traction chain, leading to a smaller number of components and a lower spatial requirement.

The invention claimed is:

1. An electric braking device including a braking torque control for an electric traction vehicle comprising:
a rotating electromechanical machine which has a stator with at least one coil, each coil having an input electric terminal to be supplied with electrical power;
a rheostatic electric braking torque production device which has no active power electronic switches;
an electromechanical commutator connected to the input electrical terminals of the rotating electromechanical machine and capable of selectively connecting the input electric terminals of the electromechanical machine to the braking torque production device; and
at least one inductor for controlling braking torque being connected in series between the electromechanical commutator and the braking torque production device.

2. The electric braking device as recited in claim 1 wherein the electric traction vehicle is a rail vehicle.

3. The braking device according to claim 1 wherein the electromechanical machine has permanent magnets.

4. The braking device according to claim 1 wherein a current switch for assisting the commutation of the electromechanical commutator is connected to terminals of each inductor.

5. The braking device according to claim 1 wherein the braking torque production device includes at least one brake resistor connected to the commutation means via the at least one inductor for controlling braking torque.

6. The braking device according to claim 5 wherein the braking torque production device includes a diode bridge rectifier and a resistor connected to output terminals of the diode bridge rectifier.

7. The braking device according to claim 6 wherein the at least one inductor for controlling braking torque is connected between the electromechanical commutator and the diode bridge rectifier.

8. The braking device according to claim 5 wherein the braking torque production device includes the bridge rectifier, a bridge rectifier being formed by free wheel diodes of a traction inverter which is connected to the electromechanical commutator, a brake resistor being connected to the terminals of the traction inverter, a contactor being connected in series to the brake resistor and a blocking circuit allowing the electronic power switches of the traction inverter to be safely inhibited.

9. The braking device according to claim 8 wherein the braking torque control inductors are connected between the commutation device and the traction inverter.

10. The braking device according to claim 1 wherein the braking torque production device includes at least three brake resistors electrically mounted in the form of a star.

11. The braking device according to claim 1 wherein the braking torque production device includes three brake resistors electrically mounted in the form of a triangle.

* * * * *